United States Patent
Komori

(10) Patent No.: US 7,151,569 B2
(45) Date of Patent: Dec. 19, 2006

(54) IMAGE PICKUP ELEMENT DRIVE CONTROL METHOD AND IMAGE PICKUP DEVICE

(75) Inventor: Hideaki Komori, Tokyo (JP)

(73) Assignee: Sony Corporation, Tokyo (JP)

( * ) Notice: Subject to any disclaimer, the term of this patent is extended or adjusted under 35 U.S.C. 154(b) by 677 days.

(21) Appl. No.: 10/207,948

(22) Filed: Jul. 29, 2002

(65) Prior Publication Data

US 2003/0025818 A1    Feb. 6, 2003

(30) Foreign Application Priority Data

Jul. 30, 2001 (JP) ............................. 2001-230423

(51) Int. Cl.
H04N 3/14    (2006.01)
(52) U.S. Cl. .................... 348/312; 348/320; 348/322
(58) Field of Classification Search ............... 348/312, 348/320, 248
See application file for complete search history.

(56) References Cited

U.S. PATENT DOCUMENTS 5,777,671 A * 7/1998 Maki et al. ................. 348/312
6,028,630 A * 2/2000 Fukui et al. ................ 348/312
6,175,384 B1 * 1/2001 Homma ...................... 348/363
6,445,411 B1 * 9/2002 Shibata et al. ......... 348/211.99
6,603,512 B1 * 8/2003 Shimokawa ................ 348/296
6,822,689 B1 * 11/2004 Nakakuki et al. ........... 348/364

* cited by examiner

*Primary Examiner*—Ngoc-Yen Vu
*Assistant Examiner*—Dillon Durnford-Geszvain
(74) *Attorney, Agent, or Firm*—Frommer Lawrence & Haug LLP; William S. Frommer; Thomas F. Presson

(57) ABSTRACT

An image pickup element drive control method can outputs a sharp image effectively without producing any overlapped images when it is driven for a high rate image pickup operation. In a high rate image pickup operation using an interline transfer type solid state image pickup element having a light receiving section of a plurality of light receiving elements arranged in the form of a matrix and adapted to accumulate respective electric charges representing the received quantity of light, a vertical transfer section for transferring the electric charges read out from said light receiving elements of said light receiving section and a horizontal transfer section for outputting the electric charges transferred to it by way of said vertical transfer section, the high speed transfer period Tc is defined by using the pulse width of external control signal EXT-VD and the image pickup signal is output by synchronizing the high speed transfer that is conducted at the timing voluntarily selected when defining the operation of the electronic shutter with the reference signal (EXT-VD) that indicates the start of a high speed transfer period.

10 Claims, 9 Drawing Sheets

ORDINARY IMAGE

IMAGE OBTAINED BY
VOLUNTARY FIRST
EFFECTIVE LINE CONTROL

ORDINARY HIGH RATE IMAGE

IMAGE PICKUP ELEMENT DRIVE CONTROL METHOD AND IMAGE PICKUP DEVICE

BACKGROUND OF THE INVENTION

1. Field of the Invention

This invention relates to a drive control method of an image pickup element that can be applied to an image pickup system for picking up an image of an object moving at high speed. Such a system typically find applications in the field of factory automation (FA).

2. Prior Art

It is a known practice that, when a signal receiving device receives a signal transmitted from a transmitter in order to drive a circuit in the receiver to operate according to the received signal, the receiver is required to prepare a signal that meets the requirements of the circuit by referring to the received signal. For such a purpose, the receiver is typically provided with a pulse generation circuit and, as annex, a pulse width selection circuit having a switch. With such an arrangement, so that the user of the receiver can select a pulse width that matches the specifications of the receiver on the basis of the signal transmitted from the transmitter for the purpose of controlling the operation of the circuit to be driven of the receiver by means of the desired pulse.

Examples of such systems that are designed to control the operation of the signal receiving side on the basis of an externally transmitted signal include video camera systems. In video camera systems, necessary video information can be taken out at high speed by transferring unnecessary signals at high speed so as to sweep them out, while transferring necessary signals by way of a normal transfer process and processing them to obtain effective pixels. This function is often referred to as high rate function. For operating a video camera by using the high rate function, it is necessary to input a reference signal that indicates the start of a high speed transfer period and also a control signal that indicates the ongoing transfer period is required.

The inventor of the present invention proposed in Japanese Patent Application Laid-Open Publication No. 10-191177 a drive control method of an image pickup element, an image pickup element, an image pickup control device and an image pickup system with which an image pickup operation is conducted by controlling the effective electric charge accumulation time of an interline transfer (IT) type solid state image sensor (CCD image sensor), thereby realizing high speed random shuttering in synchronism with a trigger signal so that an effective electric charge of a predetermined image pickup range can be obtained as image pickup signal.

Referring to FIG. 1 of the accompanying drawing illustrating an image pickup system according to the above identified invention, an electric charge read signal that is generated at a predetermined timing on the basis of a trigger signal EXT-TRG is used to read out the electric charges of the picked up image accumulated in a plurality of light receiving elements of the interline transfer type solid state image sensor to a vertical transfer section. Then, the electric charges of the picked up image read out to said vertical transfer section are vertically transferred at a high transfer rate in synchronism with vertical synchronizing pulse VD and subsequently the electric charges of the picked up image are read out as image pickup signal from said vertical transfer section by way of a horizontal transfer section at an ordinary transfer rare in synchronism with a vertical transfer signal HD. With the image pickup system, the effective electric charge of a voluntarily selected range of image can be obtained as image pickup signal by selecting a high speed transfer period and changing the number of lines output as image pickup signal.

Meanwhile, in known image pickup systems, an externally input control signal as illustrated in FIG. 2 is used as reference signal indicating the start of a high speed transfer period and the transfer period is defined by making the pulse width of the control signal variable and using a switch mounted in the camera main body to specify the transfer period. Therefore, if the switch is not of the steplessly variable type, it is not possible to select a transfer period that is less than the minimum control time unit of the switch.

On the other hand, when an image pickup system is remotely operated in a factory, the reference signal that indicates the start of a high speed transfer period is designed to be externally input to the conventional video camera system and hence can be remotely input but the switch mounted on the camera main body has to be operated to define the duration of the transfer period and hence it is not possible to remotely control the switch.

Additionally, for picking up an image of an object moving at high speed without blur, the accumulation period of the CCD image sensor has to be made short. The problem of blur is normally dissolved by using an electronic shutter for the system. Then, the object needs to be illuminated intensely by light or the aperture of the image pickup optical system has to be controlled to offset the reduction in the electric charge due to a short accumulation period in order to secure an appropriate signal output level so that an image may be picked up with the signal level of an ordinary picture as shown in FIG. 3A.

However, with this arrangement, the smear that may be produced to the vertical transfer section that is located adjacent to the light receiving section of the CCD image sensor is not controlled so that, if the image pickup system can select a high speed transfer period or an ordinary transfer period, there arises a time lag between the high speed transfer period and the ordinary transfer period. Then, a phenomenon of overlapped images arises as shown in FIG. 3B by the real image signal produced by the electric charges of the picked up image and the ghost signal produced by the smear of the vertical transfer section. The problem lies in the smear of the vertical transfer section, which changes with the time difference and can affect the signal level of the object to be shot that is found in the effective image pickup span.

SUMMARY OF THE INVENTION

In view of the above identified circumstances of the prior art, it is therefore the object of the present invention to provide a drive control method of an image pickup element and an image pickup device for which both the start of a high speed transfer period and the duration of the period can be controlled simply by inputting an external control signal and the phenomenon of overlapped images due to the smear of the vertical transfer section of the CCD image sensor can be avoided.

In an aspect of the invention, the above object is achieved by providing a drive control method of an interline transfer type image pickup element having a light receiving section of a plurality of light receiving elements arranged in the form of a matrix and adapted to accumulate respective electric charges representing the received quantity of light, a vertical transfer section for transferring the electric charges read out from said light receiving elements of said light receiving section and a horizontal transfer section for outputting the electric charges transferred therein through said vertical transfer section, said method comprising: a step of receiving an external control signal having a variably definable pulse width; a step of detecting the pulse width of said external control signal; a step of generating a vertical synchronizing signal, an ordinary vertical transfer signal and a high speed vertical transfer signal and said signals being synchronized with the timing of the front edge of said external control signal; a step of reading out the electric charges accumulated in said plurality of light receiving elements to said vertical transfer section in synchronism with the timing of the front edge of said external control signal; and a step of vertically transferring the electric charges read out to said vertical transfer section at a first transfer rate in the period corresponding to the pulse width of said external control signal by means of a high speed vertical transfer signal and vertically transferring the electric charges read out to said vertical transfer section at a second transfer rate lower than said first transfer rate in the remaining period by means of an ordinary vertical transfer signal.

In another aspect of the invention, there is provided an image pickup device comprising: an interline transfer type image pickup element having a light receiving section of a plurality of light receiving elements arranged in the form of a matrix and adapted to accumulate respective electric charges representing the received quantity of light, a vertical transfer section for transferring the electric charges read out from said light receiving elements of said light receiving section and a horizontal transfer section for outputting the electric charges transferred to it by way of said vertical transfer section; a signal receiving means for receiving an Ethernet control signal having a variably definable pulse width; a vertical synchronizing signal generating means for generating a vertical synchronizing signal synchronized with the timing of the front edge of said external control signal; an ordinary vertical transfer signal generating means for generating an ordinary vertical transfer signal synchronized with the timing of the front edge of said external control signal; a high speed vertical transfer signal generating means for generating a high speed vertical transfer signal synchronized with the timing of the front edge of said external control signal; and a control means for controlling so as to vertically transfer the electric charges read out to said vertical transfer section at a first transfer rate in the period corresponding to the pulse width of said external control signal by means of a high speed vertical transfer signal and vertically transfer the electric charges read out to said vertical transfer section at a second transfer rate lower than said first transfer rate in the remaining period by means of an ordinary vertical transfer signal.

Thus, according to the invention, it is possible to control both the start of a high speed transfer period and definition of the period simply by inputting an external control signal. In other words, according to the invention, the above period can be defined freely by means of the pulse width of an externally input control signal and hence the camera main body and the peripheral devices can be remotely controlled without touching them to a great advantage of the user. Additionally, the operation of transferring an image can be accurately conducted by synchronizing the reference signal that indicates the start of a high speed transfer period and the image output. Furthermore, no overlapping images occur because no time lag arises between the high speed transfer period and the ordinary transfer period.

DETAILED DESCRIPTION OF THE PREFERRED EMBODIMENT

Now, the present invention will be described by referring to the accompanying drawing that illustrates preferred embodiments of the invention.

Figure 1:
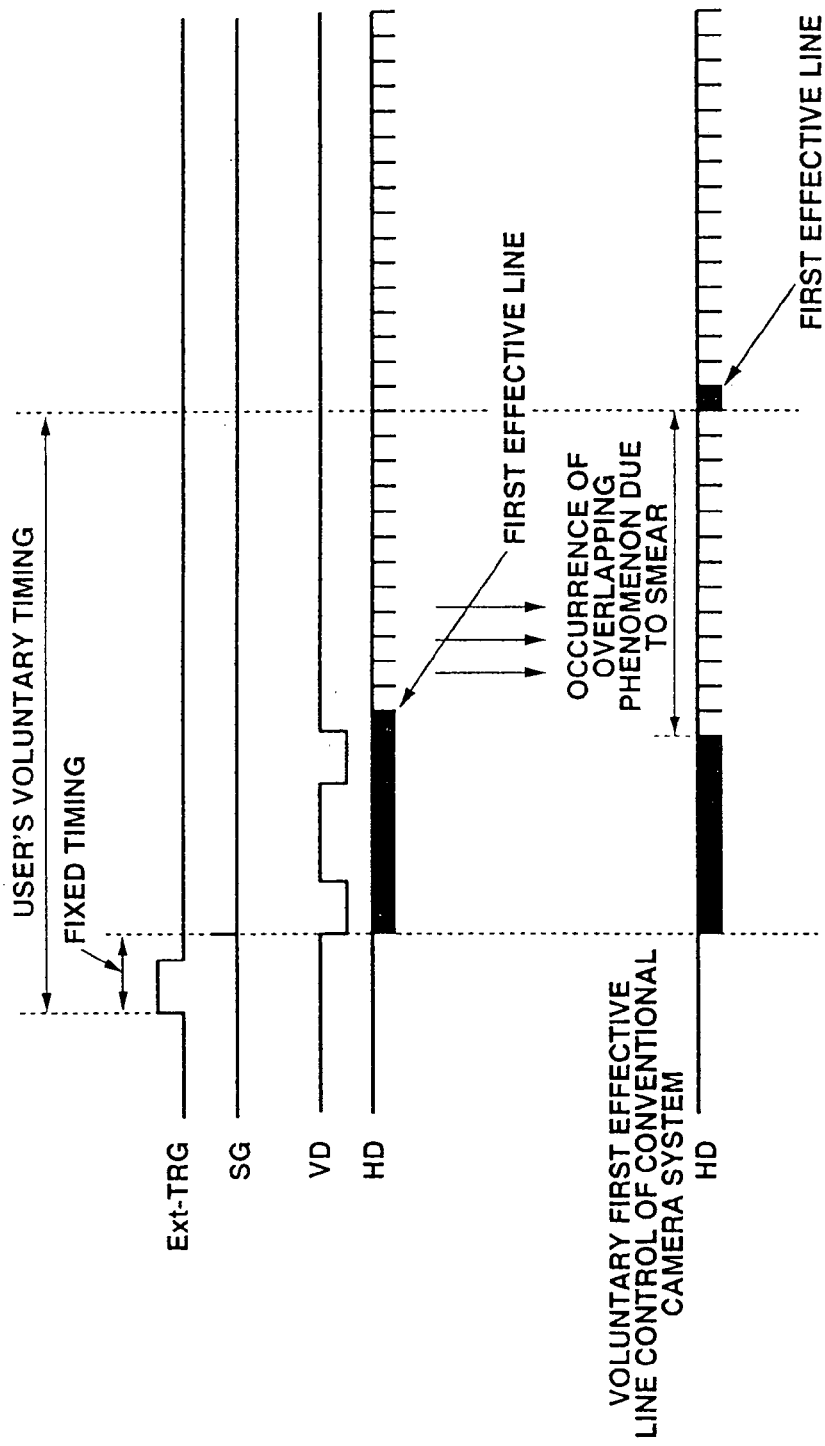
FIG. 1 is a timing chart of a high rate image pickup operation of a known image pickup system.
Figure 2:
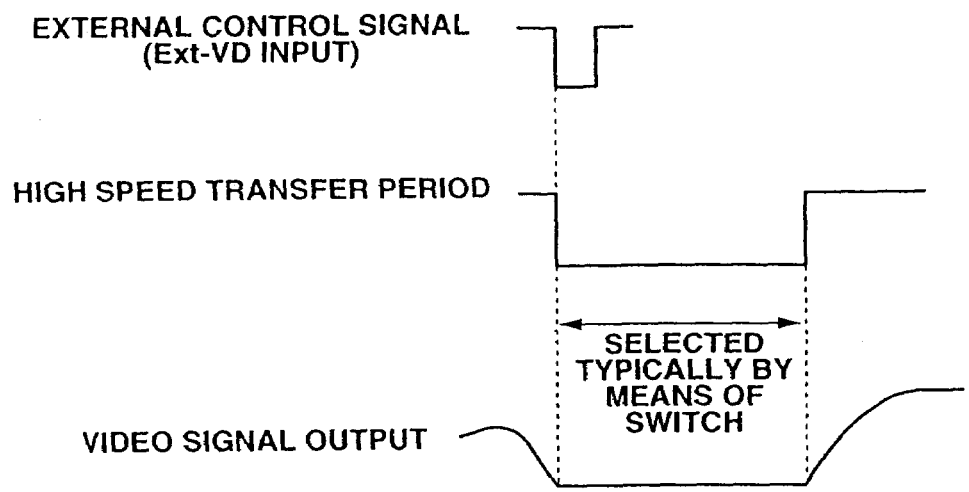
FIG. 2 is a timing chart of the operation of a known image pickup system in a high speed transfer period.
Figure 3A:
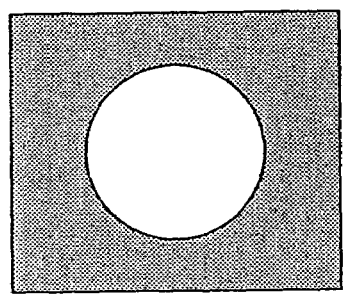
FIGS. 3A and 3B schematically illustrate an image showing an overlapping phenomenon and output as a result of a high rate image pickup operation of a known image pickup system.
Figure 3B:
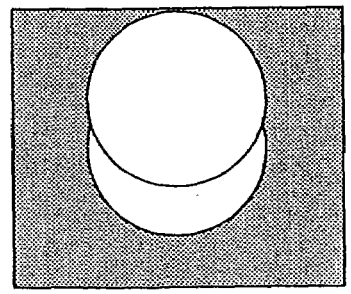
Figure 4:
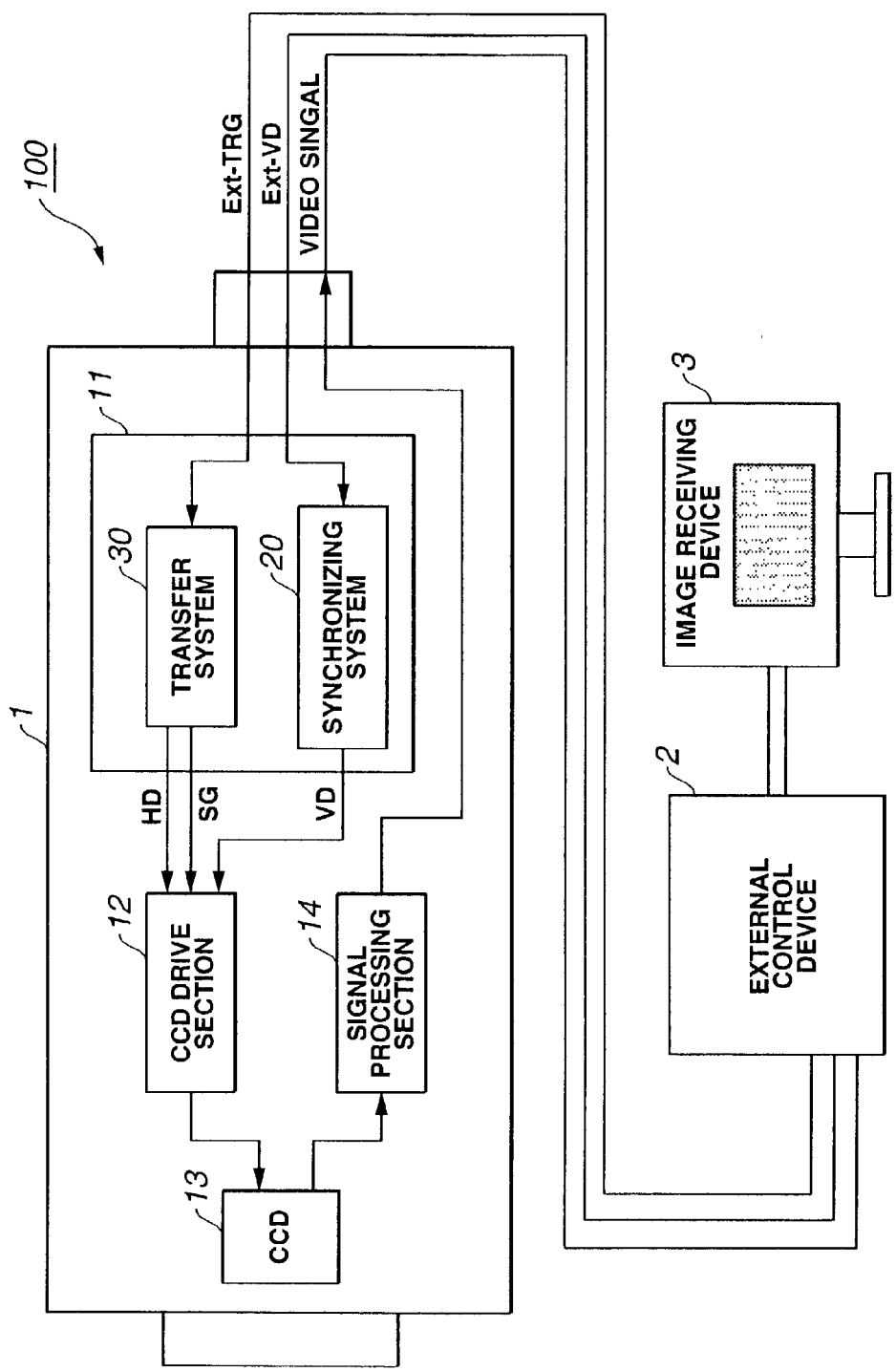
FIG. 4 is a schematic block diagram of an image pickup system realized by applying the present invention.

This invention can typically be applied to an image pickup system 100 having a configuration as shown in FIG. 4.

The image pickup system 100 comprises an image pickup device 1, an external control device 2 and an image receiving device 3.

In the image pickup system 100, the external control device 2 is adapted to supply a trigger signal EXT-TRG and an external synchronizing signal EXT-VD synchronized with the trigger signal EXT-TRG to the image pickup device 1 as external control signal. The external control device 2 is adapted to supply an image pickup signal output from the image pickup device 1 to the image receiving device 3.

The image pickup device 1 comprises a timing control section 11 to which external synchronizing signal EXT-VD and trigger signal EXT-TRG is supplied from said external control device 2, a CCD drive section 12 to which vertical synchronizing signal VD, vertical transfer signal HD and electric charge read signal SG generated by the timing control section 11 are supplied, a CCD image sensor 13 adapted to be driven by the CCD drive section 12 and a signal processing section 14 to which the electric charge of the picked up image is read out from the CCD image sensor 13 is supplied as image pickup signal.

Figure 5:
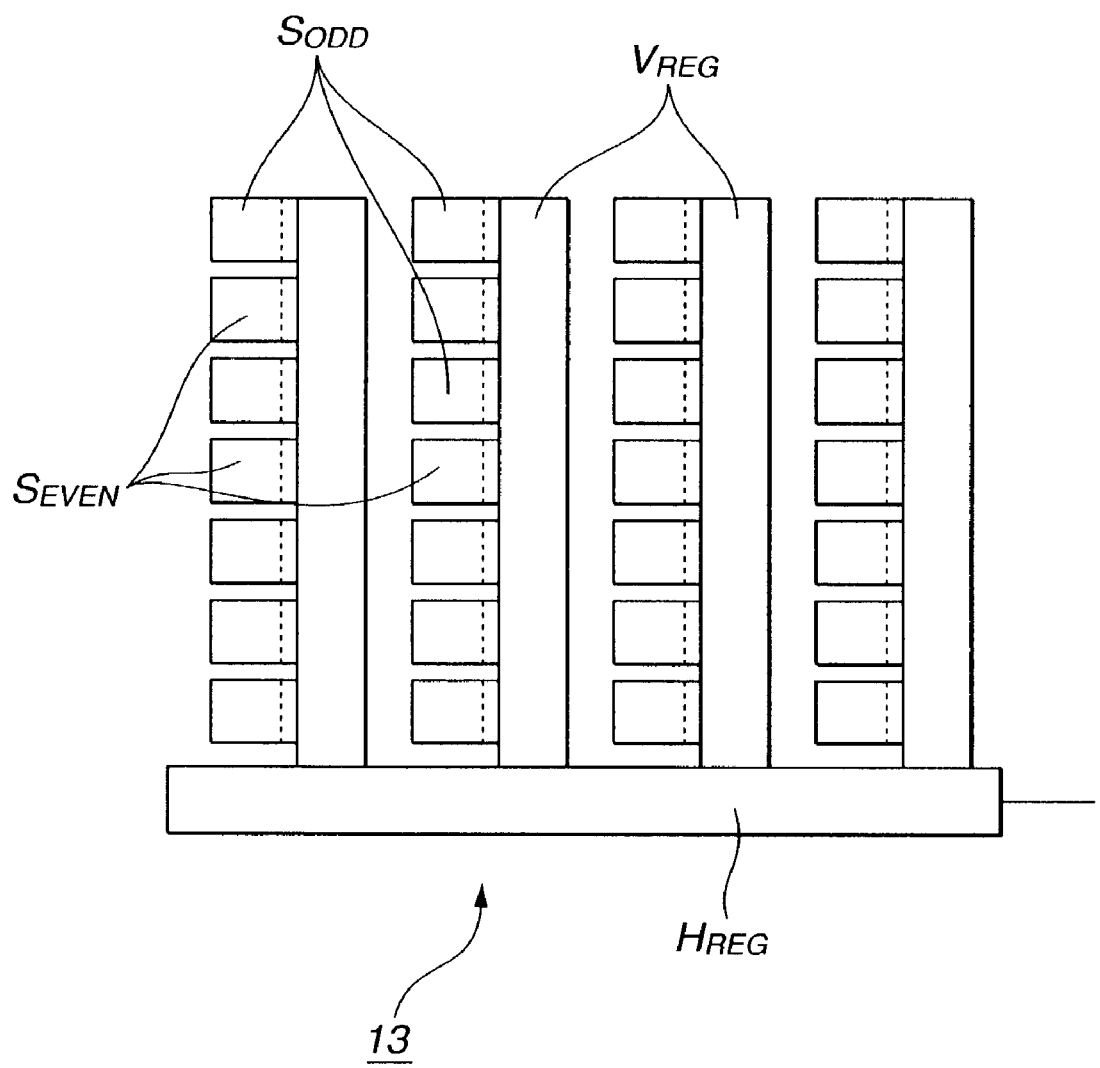
FIG. 5 is a schematic illustration of the structure of an interline transfer type CCD image sensor arranged in the image pickup device of the image pickup system of FIG. 4.

As shown in FIG. 5, the CCD image sensor 13 is an interline transfer (IT) type CCD image sensor having a configuration as shown in FIG. 5 and comprising a light receiving section where light receiving elements $S_{ODD}$ that correspond to the pixels of the odd numbered fields and light receiving elements $S_{EVEN}$ that correspond to the pixels of the even numbered fields are arranged in the form of a matrix, a vertical transfer section $V_{REG}$ from which the electric charges accumulated in the light receiving elements $S_{ODD}$ and $S_{EVEN}$ of the light receiving section are read out and a horizontal transfer section adapted to output the electric charge read out to the $V_{REG}$ as image pickup signal of a unit of a horizontal line. The CCD image sensor 13 has an electronic shutter adapted to sweep out the electric charges accumulated in the light receiving elements $S_{ODD}$ and $S_{EVEN}$ to a substrate (not shown) arranged below the light receiving elements $S_{ODD}$ and $S_{EVEN}$, thereby sweeping out the electric charges accumulated in the light receiving elements $S_{ODD}$ and $S_{EVEN}$ into the substrate so as to control the time period for accumulating electric charges.

Figure 6:
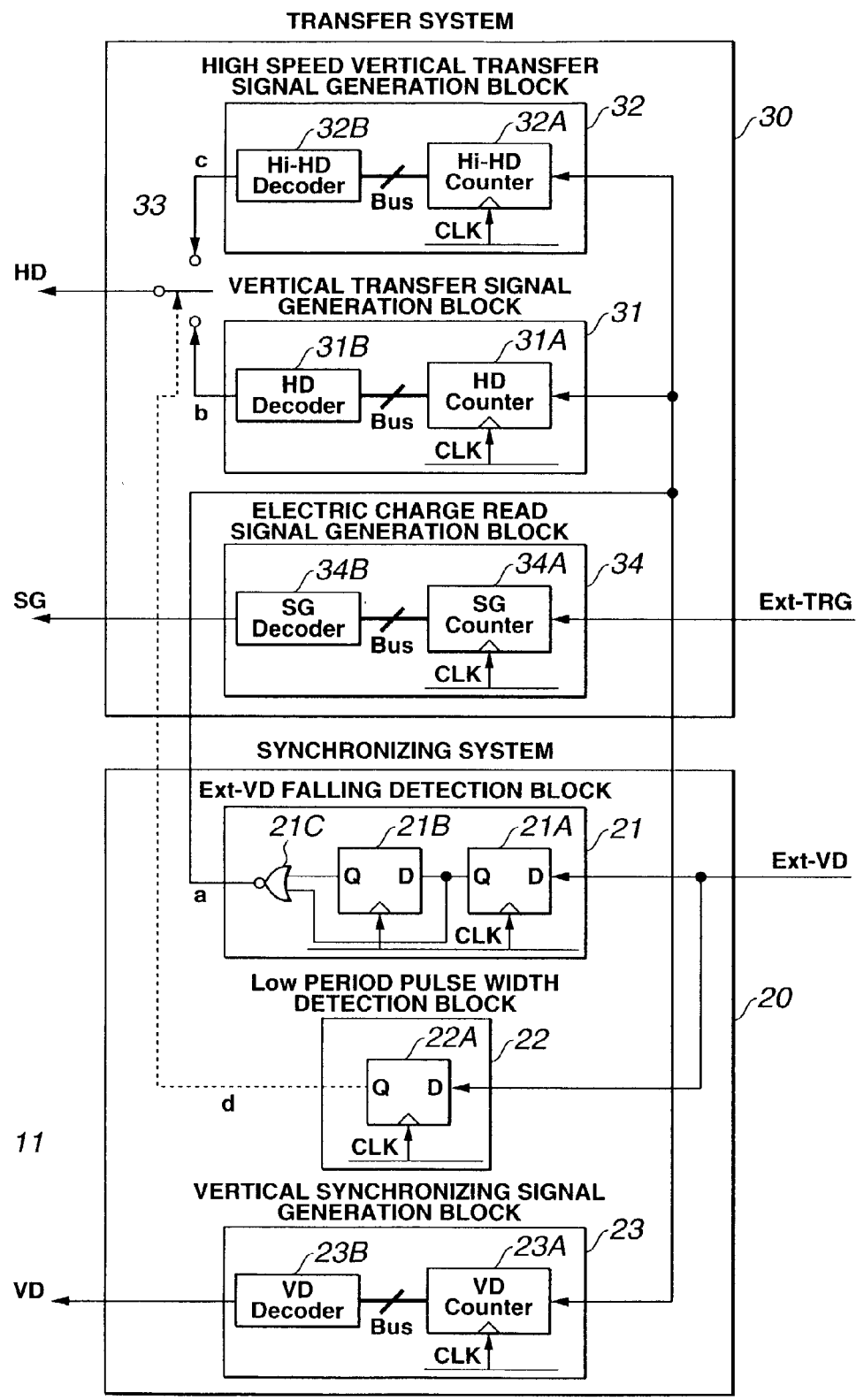
FIG. 6 is a schematic block diagram of the timing control section of the image pickup device of FIG. 5, specifically illustrating the configuration thereof.

The timing control section 11 has a configuration as specifically illustrated in FIG. 6 and comprises an integrated circuit provided with a synchronizing system circuit block 20 and a transfer system circuit block 30.

The synchronizing system circuit block 20 includes an EXT-VD falling edge detection block 21, a Low period pulse width detection block 22 and a vertical synchronizing signal generation block 23.

The EXT-VD rising edge detection block 21 is adapted to detect the falling edge or the front edge of the external synchronizing signal EXT-VD and comprises first and second D type flip-flops 21A, 21B that are driven to operate by clock pulse signal CLK and a NOR gate 21C to which the Q outputs of the first and second D type flip-flops 21A, 21B are supplied. The external synchronizing signal EXT-VD is supplied to the data terminal of the first D type flip-flop 21A and the Q output of the first D type flip-flop 21A is supplied to the data terminal of the second D type flip-flop 21B. The EXT-VD falling edge detection block 21 outputs an EXT-VD falling edge detection signal a from the NOR gate 21C, to which the Q outputs of the first and second D type flip-flops 21A, 21B are supplied.

The Low period pulse width detection block 22 is adapted to detect the Low period of the external synchronizing signal EXT-VD supplied from the external control device 20 and comprises a D type flip-flop 22A that is driven to operate by clock pulse CLK. The external synchronizing signal EXT-VD is supplied to the data terminal of the D type flip-flop 22A. The Low period pulse width detection block outputs the Q output of the D type flip-flop 22 as Low period pulse width detection signal d.

The vertical synchronizing signal generation block 23 is adapted to generate a vertical synchronizing signal VD and comprises a VD counter 23A for counting clock pulses CLK and a VD decoder 23B for decoding the output of the VD counter 23A and outputting a vertical synchronizing signal VD. The VD counter 23A is reset by the EXT-VD falling edge detection signal a from the EXT-VD falling edge detection block 21 at the timing of the front edge of the external synchronizing signal EXT-VD.

The transfer system circuit block 30 comprises a vertical transfer signal generation block 31, a high speed vertical transfer signal generation block 32, a vertical transfer signal selection switch 33 and an electric charge read signal generation block 34.

In the transfer system circuit block 30, the vertical transfer signal generation block 31 is adapted to generate a vertical transfer signal b for the ordinary transfer speed and comprises an HD counter 31A for counting clock pulses CLD and a HD decoder 31B for decoding the output of the HD counter and outputting a vertical transfer signal b for the ordinary transfer speed. The HD counter 31A is reset by the EXT-VD falling edge detection signal a from the EXT-VD falling edge detection block 21 at the timing of the front edge of the external synchronizing signal EXT-VD.

The high speed vertical transfer signal generation block 32 is adapted to generate a high speed vertical transfer signal c and comprises an Hi-HD counter 32A for counting clock pulses CLK and a Hi-HD decoder 32B for decoding the output of the Hi-HD counter 32A and outputting a high speed transfer signal c. The Hi-HD counter 32A is reset by the EXT-VD falling edge detection signal a from the EXT-VD falling edge detection block 21 at the timing of the front edge of the external synchronizing signal EXT-VD fed from the EXT-VD falling edge detection block.

The vertical transfer signal selection switch 33 is adapted to switch the vertical transfer signal b for the ordinary transfer speed generated by the vertical transfer signal generation block 34 and the high speed vertical transfer signal c generated by the high speed vertical transfer signal generation block 32 and output the selected signal as vertical transfer signal HD. The switching operation of the switch 33 is controlled by the Low period pulse width detection signal d obtained from the Low period pulse width detection block and the switch 33 outputs the high speed vertical transfer signal c, regarding the Low period of the external synchronizing signal EXT-VD as high speed transfer period Tc and the vertical transfer signal b for the ordinary transfer speed, regarding the remaining period as ordinary transfer period Tb.

The electric charge read signal generation block 34 is adapted to generate an electric charge read signal SG and comprises an SG counter 34A for counting clock pulses CLK and an SG decoder 34B for decoding the output of the SG counter and outputting an electric charge read signal SG. The SG counter 34A is reset by the trigger signal transmitting supplied from the external control device 2.

The image pickup device 1 comprising the timing control section 11 having the above described configuration performs an image pickup operation in a manner as described below.

In a state where neither the external synchronizing signal EXT-VD nor the trigger signal EXT-TRG are supplied from the external control device 2 to the image pickup device 1 of the image pickup system 100, the VD counter 23A of the vertical synchronizing signal generation block 23, the HD counter 31A of the vertical transfer signal generation block 31, the Hi-HD counter 32A of the high speed vertical transfer signal generation block 32 and the SG counter of the electric charge read signal generation block 34 of the timing control section 11 of the image pickup system 100 are running freely. The vertical transfer signal selection switch 33 does not select the high speed vertical transfer signal c generated by the high speed vertical transfer signal generation block 32 but selects only the vertical transfer signal b for the ordinary transfer speed generated by the vertical transfer signal generation block 31.

Figure 7:
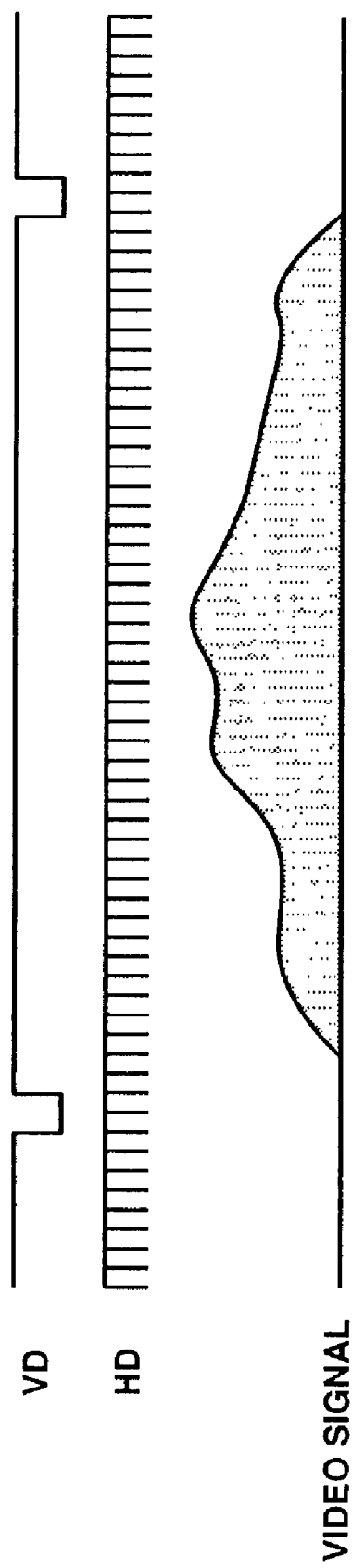
FIG. 7 is a timing chart of an ordinary image pickup operation of the image pickup system of FIG. 4.

As shown in FIG. 7, in the image pickup system 100, the CCD image sensor 13 performs an oridnary image pickup operation as the vertical synchronizing signal VD, the vertical transfer signal HD and the electric charge read signal SG generated by the synchronizing system circuit block 20 and the transfer system circuit block 30 are supplied to the CCD drive section 12 and the electric charges of the picked up image read out from the CCD image sensor 13 are output to as image pickup signal by way of the signal processing section 14.

Additionally, in the image pickup system 100, the image pickup device 2 operates in a high rate image pickup operation mode as the external synchronizing signal EXT-VD and the trigger signal EXT-TRG are supplied form the external control device 2 to the image pickup device 1.

In the high rate image pickup operation mode, the VD counter 23A of the vertical synchronizing signal generation block 23, the HD counter 31A of the vertical transfer signal generation block 31 and the Hi-HD counter 32A of the high speed vertical transfer signal generation block 32 are reset at the timing of the front edge of the external synchronizing signal EXT-VD and the SG counter 34A of the electric charge read signal generation block 34 is reset by the trigger signal EXT-TRG and start respective counting operations that are synchronized with each other. The vertical transfer signal selection switch 33 selects the high speed vertical transfer signal c for the high speed transfer period, or the Low period of the external synchronizing signal EXT-VD, as vertical transfer signal HD when it is controlled by the Low period pulse width detection signal d for its switching operation but it selects the ordinary vertical transfer signal b for the remaining period, or the ordinary transfer period Tb, as vertical transfer signal HD.

Figure 8:
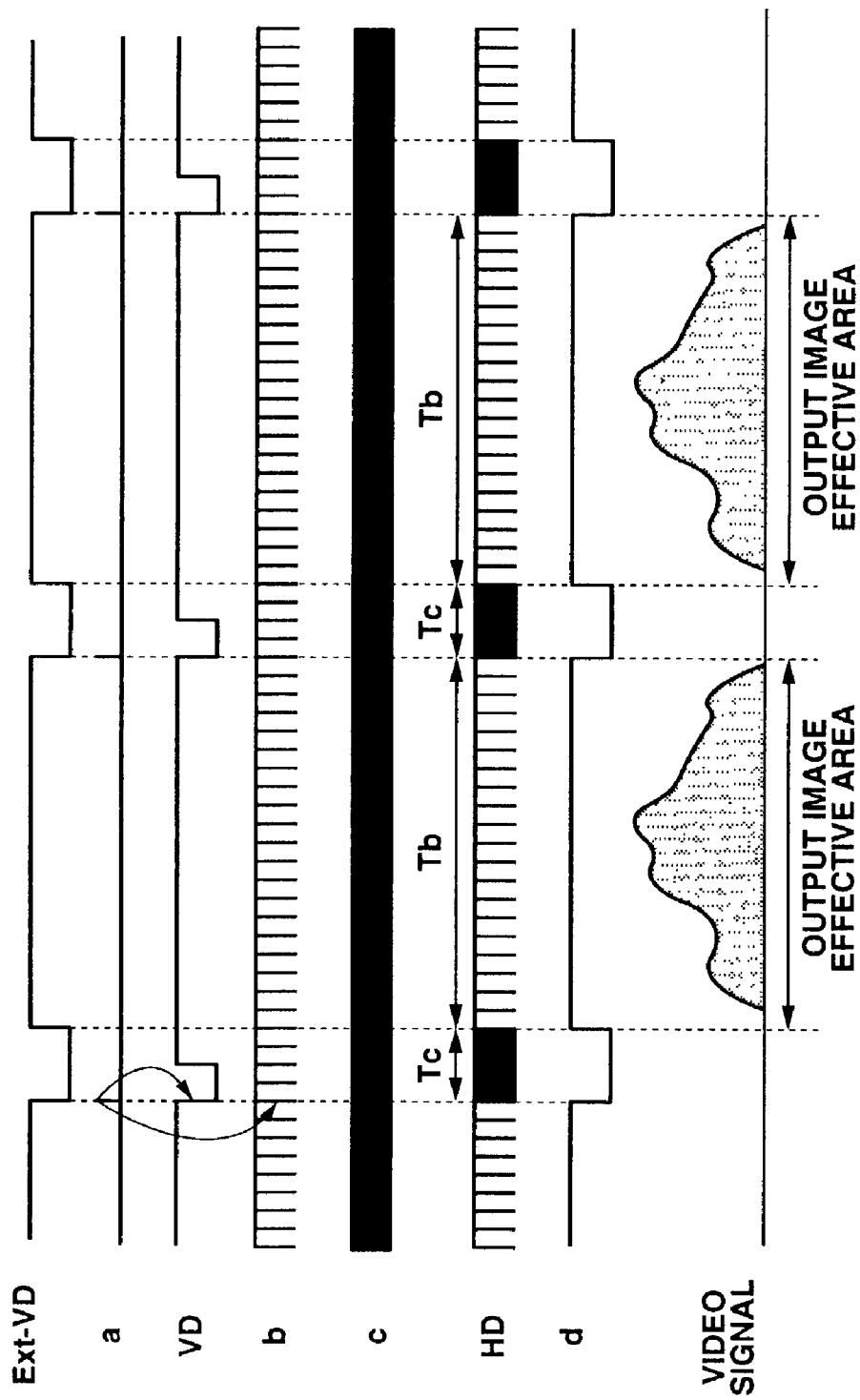
FIG. 8 is a timing chart of a high rate image pickup operation of the image pickup system of FIG. 4.

As shown in FIG. 8, in the image pickup system 100, the CCD image sensor 13 reads the electric charges accumulated in the plurality of light emitting elements $S_{ODD}$ and $S_{EVEN}$ to the vertical transfer section Vreg in synchronism with the timing of the front edge of the external control signal as the vertical synchronizing signal VD, the vertical transfer signal Hi-HD and the electric charge read signal SG generated by the synchronizing system circuit block 20 and the transfer system circuit block 30 of the timing control section are supplied to the CCD drive section 12. Then, the CCD image sensor 13 vertically transfers the electric charges read out to the vertical transfer section Vreg at the first transfer rate by means of the high speed vertical transfer signal c during the high speed transfer period Tc and also vertically transfers the electric charges of the vertical transfer section Vreg at the second transfer rate that is lower than the first transfer rate by means of the ordinary vertical transfer signal b during the subsequent ordinary transfer period Tb. With this arrangement, the CCD image sensor 13 performs a high rate image pickup operation that causes the electric charges supplied to the horizontal transfer section Hreg in the ordinary transfer period Tb to be output from the horizontal transfer section Hreg as effective electric charge. The electric charges of the picked up image that are read from the CCD image sensor 13 are then output as image pickup signal by way of the signal processing section 14.

Figure 9:
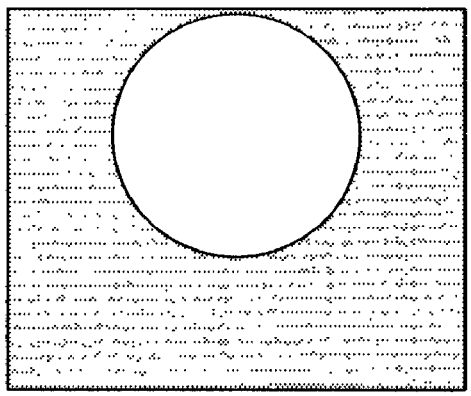
FIG. 9 is a schematic illustration of an image output without any overlapping phenomenon and output from the image pickup system of FIG. 4.

Thus, with the above described image pickup system 100, the falling edge, or the front edge, of the external synchronizing signal EXT-VD is detected by the EXT-VD falling edge detection block and the falling edge detection signal a is used as counter reset signal for resetting the VD counter 23A, HD counter 31A and the Hi-HD counter 32A of the transfer system and the synchronizing system while the Low period of the external synchronizing signal EXT-VD is detected by the Low period pulse width detection block at the same time and the vertical transfer signal selection switch 33 is controlled by the Low period pulse width detection signal d to switch the high speed transfer period Tc and the ordinary transfer period Tb of the vertical transfer signal HD. With this arrangement, it is possible to perform a high rate image pickup operation in synchronism with the falling edge of the external synchronizing signal EXT-VD. Additionally, since no time lag arises between the high speed transfer period Tc and the ordinary transfer period Tb, a high rate image pickup operation can be conducted without producing the phenomenon of overlapped images as evidenced by FIG. 9.

Thus, this image pickup system 100 does not give rise to any phenomenon of overlapped images and a high rate image pickup operation can be conducted at any desired timing of the user.

Figure 10:
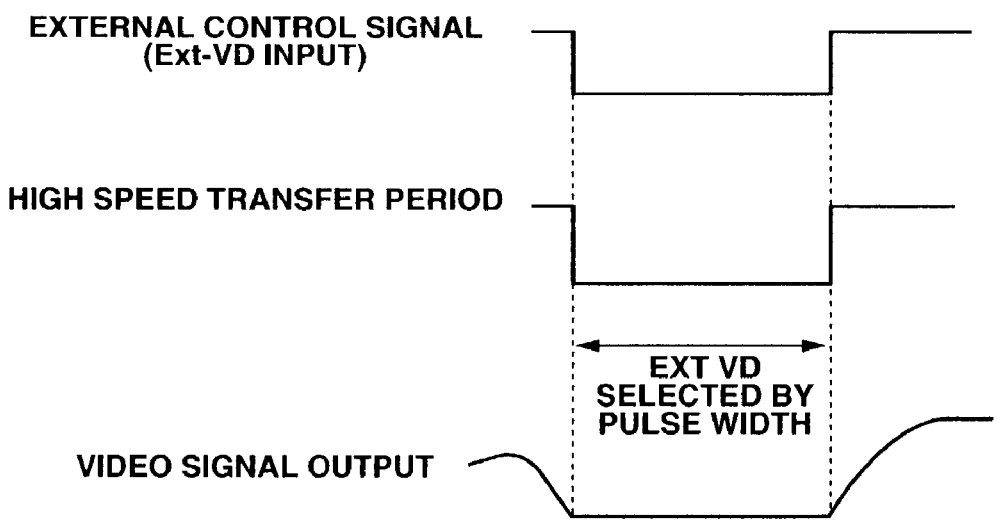
FIG. 10 is a timing chart illustrating the principle of variably defining a high speed transfer period of the image pickup system of FIG. 4.
Figure 11:
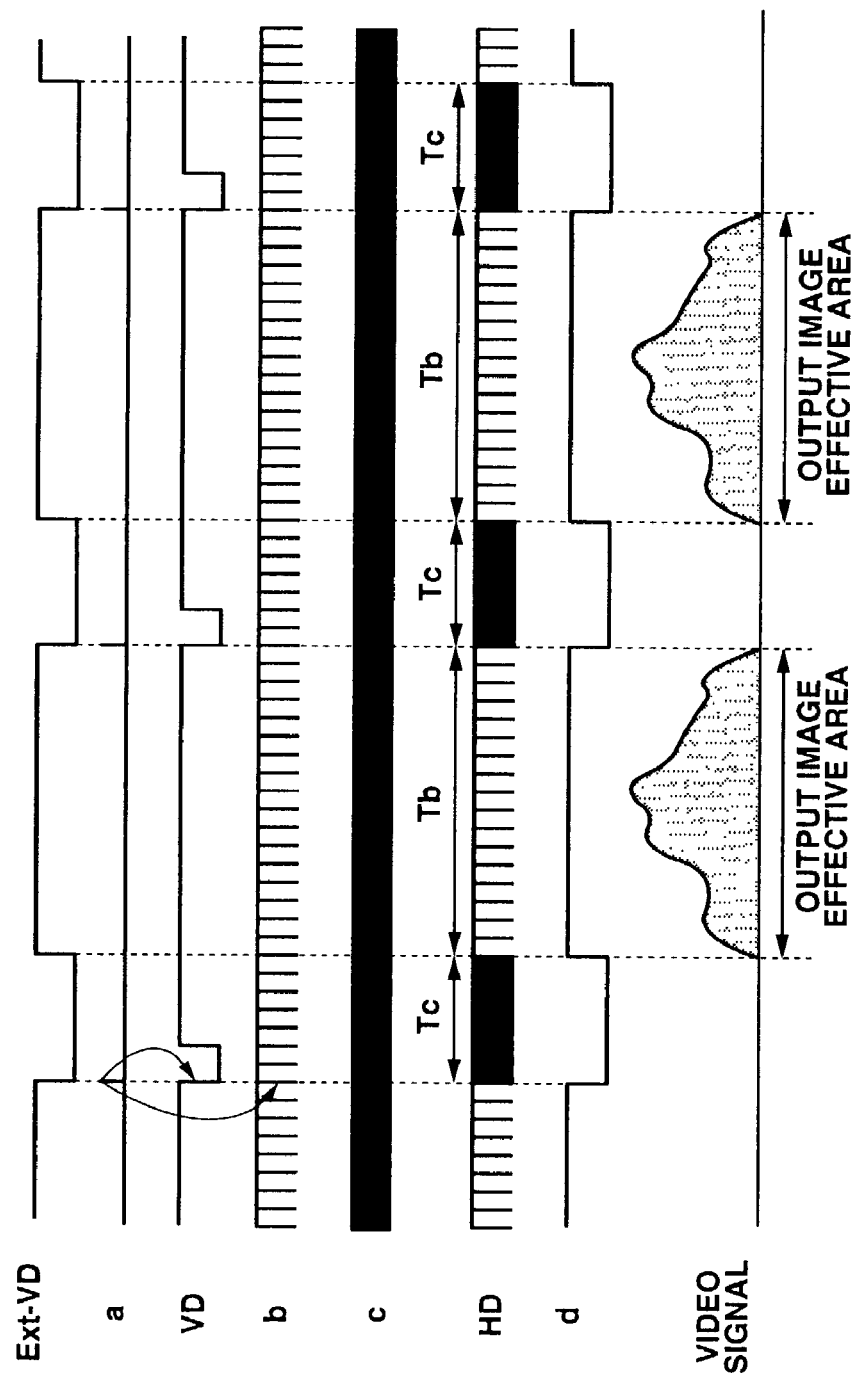
FIG. 11 is a timing chart of a high rate image pickup operation performed by inputting an external synchronizing signal EXT-VD having a broadened pulse width to the image pickup device of the image pickup system of FIG. 4 from an external control device.

Additionally, as shown in FIG. 10, it is possible to control the high speed transfer period Tc in the high rate image pickup operation by making the pulse width of the external synchronizing signal EXT-VD variable as the signal is suppled to the image pickup device 1 of the image pickup system 100 from the external control device 2.

Therefore, if the amount of necessary video information (effective period) is small, a long high speed transfer period (ineffective period) Tc can be defined by inputting an external synchronizing signal EXT-VD whose pulse width is broadened to the image pickup device from the external control device 2 in order to accommodate the situation. The high speed transfer period Tc can be modified in a stepless manner so that it can be defined freely in a delicate way because no switch is used for modifying the period Tc.

Additionally, if compared with conventional systems, unnecessary video data can be efficiently removed to obtain necessary video information accurately at high speed because a range of image can be selected with an enhanced level of freedom in synchronism with the external synchronizing signal EXT-VD.

Furthermore, the range of image can be controlled by means of the pulse width of the external synchronizing signal EXT-VD. In other words, the image pickup device can be operated remotely to a great advantage of the system user.

Finally, the present invention does not involve any serial/parallel (software) control, the vertical transfer pulse can be controlled directly and immediately to provide an advantage of real time operation.

What is claimed is:

1. A drive control method of an interline transfer type image pickup element having a light receiving section of a plurality of light receiving elements arranged in the form of a matrix and adapted to accumulate respective electric charges representing the received quantity of light, a vertical transfer section for transferring the electric charges read out from said light receiving elements of said light receiving section and a horizontal transfer section for outputting the electric charges transferred therein from said vertical transfer section, said method comprising:
   a step of receiving an external control signal having a variably definable pulse width;
   a step of detecting the pulse width of said external control signal;
   a step of generating a vertical synchronizing signal by selecting an ordinary vertical transfer signal or a high speed vertical transfer signal each as a function of the detected pulse width;
   a step of reading out the electric charges accumulated in said plurality of light receiving elements to said vertical transfer section in synchronism with the timing of the front edge of said external control signal; and
   a step of vertically transferring the electric charges read out to said vertical transfer section at a first transfer rate in the period corresponding to the pulse width of said external control signal by means of a high speed vertical transfer signal and vertically transferring the electric charges read out to said vertical transfer section at a second transfer rate lower than said first transfer rate in the remaining period by means of an ordinary vertical transfer signal.

2. The method according to claim 1, wherein a range of image output as effective electric charge is modified according to the pulse width of said external control signal.

3. The method according to claim 2, wherein the pulse width of said external control signal is broadened when a range of image output as effective electric charge is small.

4. The method according to claim 1, wherein said high speed transfer period is controlled by the low pulse width of said external control signal.

5. An image pickup device comprising:

an interline transfer type image pickup element having a light receiving section of a plurality of light receiving elements arranged in the form of a matrix and adapted to accumulate respective electric charges representing the received quantity of light, a vertical transfer section for transferring the electric charges read out from said light receiving elements of said light receiving section and a horizontal transfer section for outputting the electric charges transferred to it by way of said vertical transfer section;

a signal receiving means for receiving an Ethernet control signal having a variably definable pulse width;

a vertical synchronizing signal generating means for generating a vertical synchronizing signal synchronized with the timing of the front edge of said external control signal by selecting an ordinary vertical transfer signal or a high speed vertical transfer signal each as a function of the pulse width;

an ordinary vertical transfer signal generating means for generating an ordinary vertical transfer signal synchronized with the timing of the front edge of said external control signal;

a high speed vertical transfer signal generating means for generating a high speed vertical transfer signal synchronized with the timing of the front edge of said external control signal; and a control means for controlling so as to vertically transfer the electric charges read out to said vertical transfer section at a first transfer rate in the period corresponding to the pulse width of said external control signal by means of a high speed vertical transfer signal and vertically transfer the electric charges read out to said vertical transfer section at a second transfer rate lower than said first transfer rate in the remaining period by means of an ordinary vertical transfer signal.

6. The device according to claim 5, wherein said image pickup device further comprises a selection means for defining a period corresponding to the detected pulse width of said external control signal as high speed transfer period and the remaining period as ordinary transfer period and selecting said ordinary vertical transfer signal and said high speed vertical transfer signal correspondingly.

7. The device according to claim 5, wherein said image pickup device further comprises an output means for causing said horizontal transfer section to output the electric charge supplied to said horizontal transfer section in said ordinary transfer period as effective electric charge.

8. The device according to claim 7, wherein a range of image output as effective electric charge is modified according to the pulse width of said external control signal.

9. The device according to claim 8, wherein the pulse width of said external control signal is broadened when a range of image output as effective electric charge is small.

10. The device according to claim 8, wherein said high speed transfer period is controlled by the low pulse width of said external control signal.

* * * * *